United States Patent [19]

Ramage

[11] Patent Number: 4,790,028
[45] Date of Patent: Dec. 6, 1988

[54] METHOD AND APPARATUS FOR GENERATING VARIABLY SCALED DISPLAYS

[75] Inventor: William W. Ramage, Murrysville, Pa.

[73] Assignee: Westinghouse Electric Corp., Pittsburgh, Pa.

[21] Appl. No.: 906,718

[22] Filed: Sep. 12, 1986

[51] Int. Cl.$^4$ .............................................. G06K 9/42
[52] U.S. Cl. ...................................... 382/47; 382/44; 382/45; 358/22; 358/100; 340/731; 364/188; 364/522
[58] Field of Search ............... 364/188, 514, 518, 521, 364/522; 340/712, 731; 358/22, 100, 903, 180; 382/41, 44, 45, 46, 47, 49

[56] References Cited

U.S. PATENT DOCUMENTS

| | | | |
|---|---|---|---|
| 4,122,438 | 10/1978 | Bird | 340/731 |
| 4,267,573 | 5/1981 | Chaikin et al. | 382/47 |
| 4,302,011 | 11/1981 | Pepper, Jr. | 178/19 |
| 4,366,475 | 12/1982 | Kishi et al. | 340/731 |
| 4,396,977 | 8/1983 | Slater et al. | 364/188 |
| 4,400,780 | 8/1983 | Nagao et al. | 340/731 |
| 4,504,913 | 3/1985 | Miura et al. | 364/521 |
| 4,553,215 | 11/1985 | Masuda et al. | 382/47 |
| 4,682,227 | 7/1987 | Heerah | 358/22 |

Primary Examiner—Leo H. Boudreau
Assistant Examiner—Jose L. Couso
Attorney, Agent, or Firm—D. C. Abeles

[57] ABSTRACT

Portions of an image generated on an electronic display device are magnified for closer examination while other areas are compressed so that no material is lost from the total viewing area. To achieve this, the image is divided into segments with some assigned scaling functions having values greater than one and others assigned scaling functions having values less than one in a manner such that the mean value of the scaling functions across the screen is one. A transformation function is generated for each segment as a function of the assigned scaling functions. Each image point is then transformed using the appropriate transformation function an a rescaled image is generated from the rescaled image points. The variably scaled image can be generated on a touch screen device such that an area to be magnified can be designated by touching the screen at the desired location and the value of the scaling function can be set as a function of the length of time that the screen is touched.

22 Claims, 6 Drawing Sheets

METHOD AND APPARATUS FOR GENERATING VARIABLY SCALED DISPLAYS

BACKGROUND OF THE INVENTION

1. Field of the Invention

This invention relates to generating visual displays of spatially related material, such as for instance schematic diagrams and flow charts, on electronic display devices such as cathode ray tubes, and more particularly to magnifying portions of such displays without changing the boundaries of the total viewiwng area and without losing the spatial relationship between the material that is magnified and the remaining material.

2. Prior Art

The display of large area illustrations on limited area devices such as cathode ray tubes poses the dilemma of having to choose between total area display at reduced magnification or only partial area displays at normal or increased magnification. An example of this predicament is the display of schematic diagrams or flow charts where it is desired to see the overall layout and structure and, on the same display, have sufficient magnification to see local detail and annotation.

The conventional solution to this problem is to have separate displays of different magnifications, and an observer must then switch between displays to satisfy the need for both detailed information and overall structure and context. This solution is not only aggravating but requires the observer to remember information from one display while using another. When the needed information extends over several partial area displays of normal magnification, the observer's work load and memory requirements can be such that the displays become unusable.

It is a primary object of the invention to magnify selected portions of an image presented in a display area of fixed dimensions without eliminating any material from the image.

It is also an object of the invention to achieve the above object while maintaining the indicated relationships between material in the magnified areas and that in the other areas.

SUMMARY OF THE INVENTION

These and other objects are realized by variably scaling an image such that the entire image or a part thereof includes portions which are shown at increased magnification and other portions which are shown at reduced magnification, but with the mean magnification across the entire image remaining equal to one. More particularly, the image area can be divided into image area segments. Each image area segment is assigned a scaling function such that the mean value of the scaling functions across the entire viewing area equals one. A transformation function is generated for each image area segment as a function of the associated scaling function. Image points for each image area segment are transformed in accordance with the associated transformation function. A rescaled image is then generated utilizing the transformed image points. As an alternative to dividing the image area into segments, each with its own scaling funtion, a single, continuously variable scaling function which has a mean value of one, such as a trigonometric function, can be applied to the entire image area or a portion thereof.

This variable scaling may be applied in only one coordinate or both. In any event the mean value of the scaling function across the entire image must be equal to one. In order to eliminate distortion in the area to be examined in greater detail, a scaling function having a constant value greater than one can be applied to the desired portion of the image. Since the remaining area of the image must be compressed to stay within the fixed viewing area, it is desirable to have the magnitude of the scaling function which is greater than one be an inverse function of the size of the image area segment to be magnified. This will limit the distortion of the compressed area having scaling function values less than one. In fact, a preferred arrangement is to select the size of the image area segment to be magnified such that the area covered by it when magnified remains a constant for all values of the scaling function. Thus, by selecting the scaling function, the area to be magnified is set, or vice versa. This arrangement may be implemented by generating the image on a touch screen. The area to be magnified may be designated, for instance, by touching the image at the desired center of the area. The value of the scaling function, and therefore also the size of the area to be magnified, can be set as a function of the length of time that contact is maintained with the touch screen at the center of the area to be magnified.

In a preferred embodiment of the invention, the image area segment to be magnified by a scaling function having a constant value is circular. The value of the scaling function by which the remaining area of the image is compressed varies as a function of the radial distance between the center of the magnified area and the edge of the total image area for all angular positions around the circular magnified area. The shorter the radial distance, the greater the compression. Thus, where the magnified image area segment is close to one corner of a rectangular image, the area between the magnified segment and the nearby edges is more highly compressed than other portions of the image outside the magnified area.

To reduce distortion at the boundary between an area of constant magnification and the surrounding area, a transition area can be provided around the magnified area with a scaling function having a value between those of the scaling function with a constant value and the scaling function for the remainder of the image.

While the technique of variably scaling an image will produce some distortion, this distortion can be reduced as indicated, and in any event, for diagrams such as schematics or flow charts, where layout is a matter of convenience, this distortion produces no loss of information or intelligibility.

The invention encompasses both the method and apparatus for generating variably scaled displays.

BRIEF DESCRIPTION OF THE DRAWINGS

A full understanding of the invention can be gained from the following description when read in conjunction with the accompanying drawings in which.

DESCRIPTION OF THE PREFERRED EMBODIMENTS

The invention will be described as applied to a system for electrically generating an illustration, especially for example a flow chart for a schematic diagram. In carrying out the invention selected segments of the viewing area are magnified. When a segment of the illustration is enlarged, other segments must be compressed by an equivalent amount in order to contain the total image within a fixed display area. This is accomplished through a scaling of coordinate values such that the mean value of the scaling function S, over the total viewing area equals one. In this regard, the scaling transformations can be represented in cartesian coordinates by the equations:

$$x' = \int_0^x f(x,y)dx \quad \text{(Eq. 1)}$$

$$y' = \int_0^y g(x,y)dx \quad \text{(Eq. 2)}$$

where $x'$=the new location of the x coordinate of an image point, $y'$=the new location of the y coordinate, and $f(x,y)$ and $g(x,y)$ represent the pointwise scaling functions in the two axes. The mean values of the scaling functions $\bar{S}_x$ and $\bar{S}_y$ for the x and y axes respectively, which must both equal one, are then defined by the equations:

$$\bar{S}_x = \frac{\int_{x_{min}}^{x_{max}} f(x,y)dx}{\int_{x_{min}}^{x_{max}} dx} = 1 \quad \text{(Eq. 3)}$$

$$\bar{S}_y = \frac{\int_{y_{min}}^{y_{max}} g(x,y)dy}{\int_{y_{min}}^{y_{max}} dy} = 1 \quad \text{(Eq. 4)}$$

Figure 1:
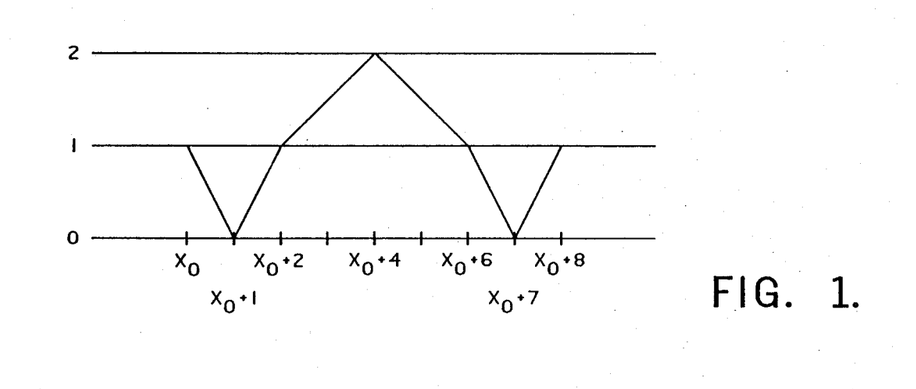
FIG. 1 is a diagram illustrating a piecewise linear scaling transformtion in accordance with the teachings of the invention.

An example of a piecewise linear scaling transformation in the x axis only is shown in FIG. 1. In this example, the scaling is invariant (scale factor is 1) for $x \leq x_0$ and $x \geq x_0+8$. For $x_0<x<x_0+2$, and $x_0+6<x<x_0+8$, the scaling transformation is one of compression (the value of the scaling function is less than 1) and for $x_0+2<x<x_0+6$ the scaling transformation is that of expansion (the value of the scaling function is greater than 1).

More specifically the values of the scaling functions are as follows:

| | |
|---|---|
| $S_0 = 1$ | $x \leq x_0$ |
| $S_1 = 1 - (x - x_0)$ | $x_0 < x \leq x_0 + 1$ |
| $S_2 = x - (x_0 + 1)$ | $x_0 + 1 < x \leq x_0 + 2$ |
| $S_3 = 0.5(x - x_0 - 2) + 1$ | $x_0 + 2 < x \leq x_0 + 4$ |
| $S_4 = 2 - 0.5(x - x_0 - 4)$ | $x_0 + 4 < x \leq x_0 + 6$ |
| $S_5 = 1 - (x - x_0 - 6)$ | $x_0 + 6 < x \leq x_0 + 7$ |
| $S_6 = x - (x_0 + 7)$ | $x_0 + 7 < x \leq x_0 + 8$ |
| $S_7 = 1$ | $x_0 + 8 \leq x$ | where the expressions for $S_0$ through $S_7$ are the equations for the line segments in FIG. 1.

As can be appreciated from FIG. 1, the mean value of the scaling functions across the range $x_0 \leq x \leq x_0+8$ is equal to one. This can be shown by the following:

$$S_x = \frac{\int_{x_0}^{x_0+8} S\, dx}{\int_{x_0}^{x_0+8} dx}$$

$$= \frac{\int_{x_0}^{x_0+1} S_1 dx + \int_{x_0+1}^{x_0+2} S_2 dx + \int_{x_0+2}^{x_0+4} S_3 dx}{\int_{x_0}^{x_0+8} dx} +$$

$$\frac{\int_{x_0+4}^{x_0+6} S_4 dx + \int_{x_0+6}^{x_0+7} S_5 dx + \int_{x_0+7}^{x_0+8} S_6 dx}{\int_{x_0}^{x_0+8} dx}$$

$$= \frac{\frac{1}{2} + \frac{1}{2} + 3 + 3 + \frac{1}{2} + \frac{1}{2}}{8} = 1$$

Figure 2:
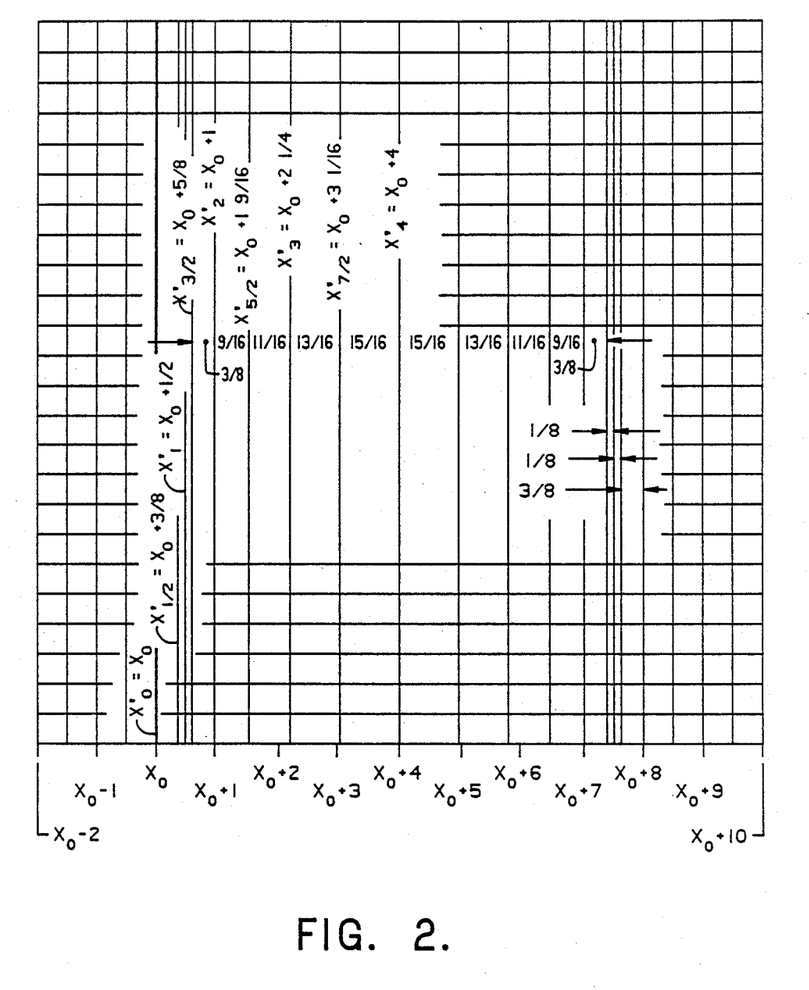
FIG. 2 illustrates a display generated using the transformation of FIG. 1.

The transformation created by this example is illustrated in FIG. 2. Lines are provided at each half unit on the x axis to more clearly illustrate the compressions which occur between $x_0$ and $x_0+2$ and between $x_0+6$ and $x_0+8$ and the expansion that occurs between $x_0+2$ and $x_0+6$. The amount that each line is transformed depends upon how much the other lines have been transformed. Thus, using equation (1) and the scaling functions set forth above, the amount that each line is shifted can be calculated.

For example, in the case of the line $x_0+2$:

$$x_2' = x_0 + \int_{x_0}^{x_0+1} S_1 dx + \int_{x_0+1}^{x_0+2} S_2 dx$$

where $x_2'$ equals the transformed position of the original line $x_0+2$. Then:

$$x_2' = x_0 + \int_{x_0}^{x_0+1} [1 - (x - x_0)]dx +$$

$$\int_{x_0+1}^{x_0+2} [x - (x_0 + 1)]dx = x_0 + 1$$

Thus, the line $x_0+2$ is shifted to the left in FIG. 2 to the position formerly occupied by the line $x_0+1$. This shift is indicated in FIG. 2 by the designation, $x_0+2$, below the x axis which indicates the original location, and the line with the notation "$x_2'=x_0+1$" which indicates its transformed location. Each of the lines between $x_0$ and $x_0+8$ is shifted in a similar manner. The relative distances between adjacent lines illustrates the areas of compression and expansion. The fractions across the middle of the figure indicate the fractional distance between adjacent half lines. Thus the distance between $x_2'$ (originally $x_0+2$) and $x_{3/2}'$ (originally $x_0+3/2$) is $\frac{3}{8}$ units while the distance to $x'_{5/2}$ (originally $x_0+5/2$) is 9/16. Since these distances were originally $\frac{1}{2}$ unit, it can be seen that the portion of the figure to the left of the line $x_2'$ is compressed while the area to the right is expanded, which agrees with the scaling established in FIG. 1.

In this example, variable scaling was only applied in the x axis of the cartesian coordinate system. It can be appreciated that similar variable scaling, although not necessarily the same function, can be applied in the y direction.

Figure 3:
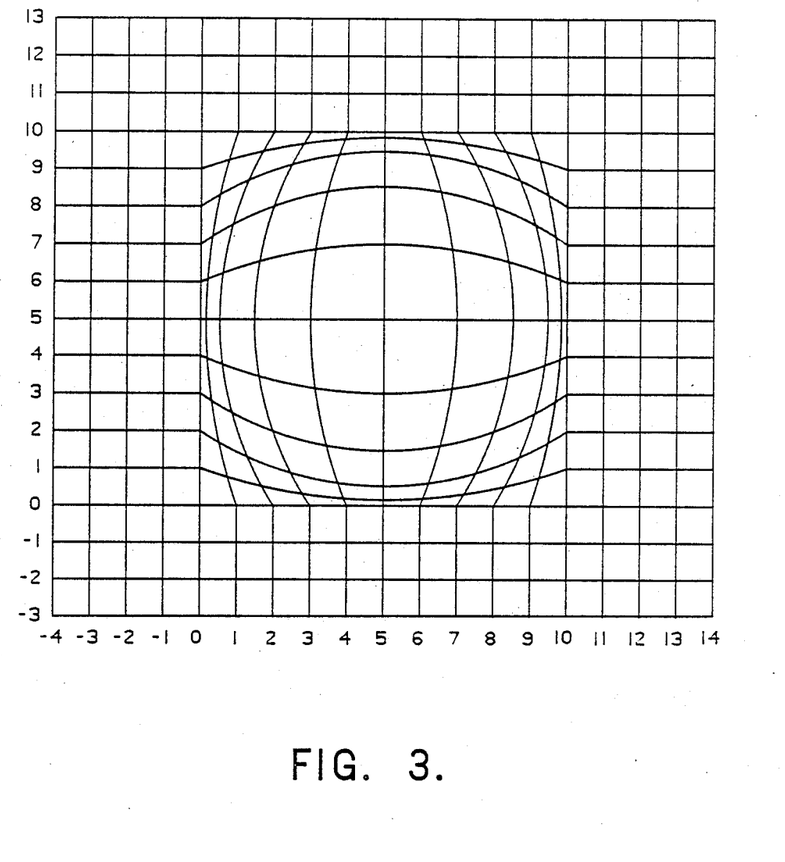
FIG. 3 is an illustration of a display generated using a continuously variable scaling transformation.

A scale transformation that is a function of both cartesian coordinates is illustrated in FIG. 3. This transformation modifies the value of the scaling function within the area $0 \leq x \leq 10$, $0 \leq y \leq 10$ in accordance with the trigonometric function below, where the scaling functions for the x and y axes respectively are:

$$f_x(x,y) = 1 - \sin\frac{\pi y}{10} \cos\frac{2\pi}{10} x$$

$$g_y(x,y) = 1 - \sin\frac{\pi x}{10} \cos\frac{2\pi}{10} y$$

And the transformed locations are as follows:

$$x' = 0 + \int_{x=0}^{x} f_x(x,y)dx = x - \frac{10}{2\pi} \sin\frac{\pi y}{10} \sin\frac{2\pi}{10} x$$

$$y' = o + \int_{y=o}^{y} g_y(x,y)dy = y - \frac{10}{2\pi} \sin\frac{\pi x}{10} \sin\frac{2\pi}{10} y$$

Figure 4:
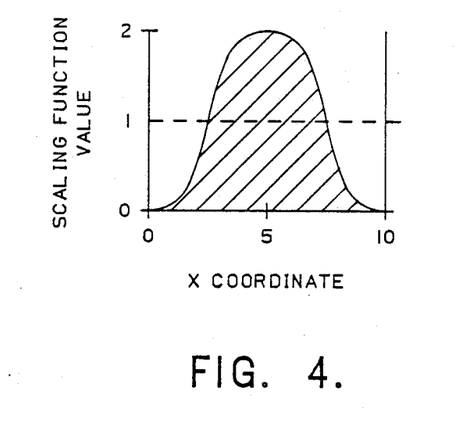
FIG. 4 is a diagram illustrating a trigonometric scaling function used to generate the display of FIG. 3.

Such a transformation provides continuously variable scaling in both axes over the image area segment to which the transformation functions are applied. FIG. 4 illustrates the trigonometric scaling function of the example, for instance for the x coordinates at the location where y=5, i.e. the mid-point vertically of the transformed area in FIG. 3. The effect of this transform is some distortion in the transformed area. Vertical and horizontal straight lines in the original illustration follow the contours established in FIG. 3. This is not a serious drawback in displaying schematics and flow charts where it is the relative relationships of component parts which is relevant.

Figure 5:
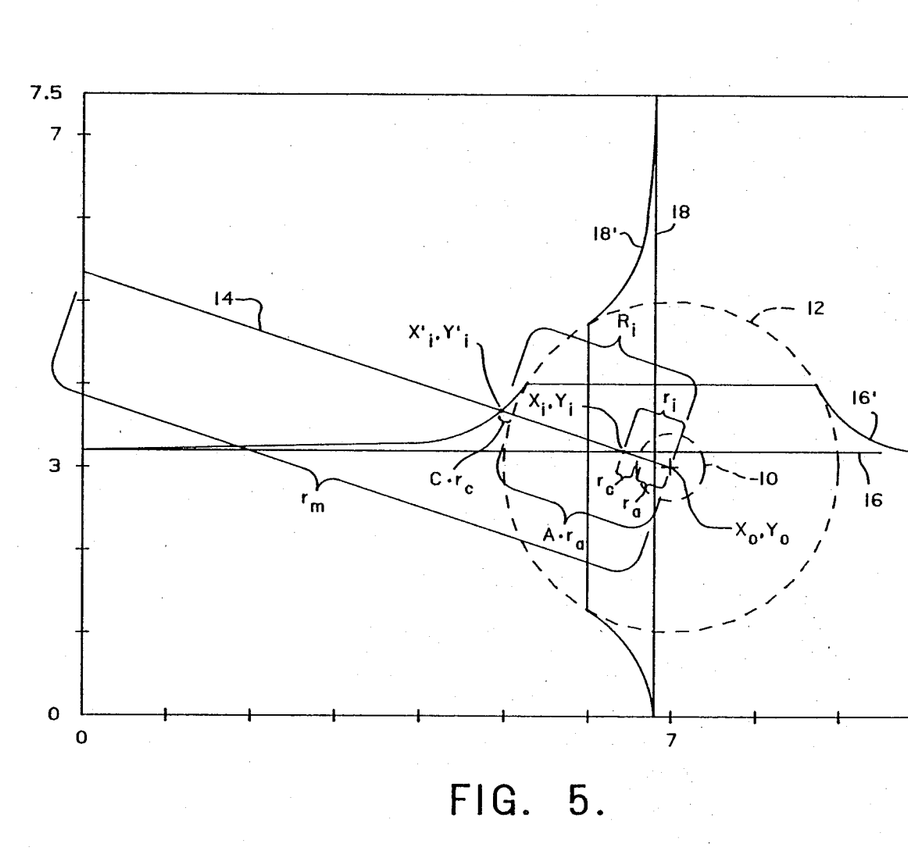
FIG. 5 is an illustration of a display using a constant scaling function having a value greater than one in a circular image area.

It is desirable in some instances, however, to employ a scaling function with a constant value across the magnified image area segment so that there is no distortion in the portion of the illustration which is to be examined more closely. An example of such an arrangement is depicted in FIG. 5. For illustrative purposes, the magnified viewing area segment is circular, although any shaped area can be used. The portion of the original viewing area which is expanded is defined by the circle 10. This area is expanded by a scaling function of constant value, in the example a factor of 5, to the area defined by the circle 12.

The area outside of the circle 10 must be compressed to maintain a mean value of the scaling function of one across the entire viewing area. Since the area 10 selected for expansion in this example is below and to the right of the center of the illustration, it is evident from viewing FIG. 5, that the portion of the illustration below and to the right of the expanded area will be more highly compressed than the portions above and to the left. Thus, the area outside of the expanded area is subjected to a variable compression scaling function. The transformation for this example is best carried out in polar coordinates. A radial line 14 is drawn from the center of the expanded area, which is at $x_0,y_0$, through each point to be transformed, $x_i,y_i$.

Let:
 $r_a$=radius of area to be expanded:
 A=the value of the scaling function for the area to be expanded (A>1).
 C=the value of the scaling function for the portion of the line 14 to be compressed (C<1).
 $r_m$=distance from center of area to be expanded to edge of viewing area along the line 14.

Thus, when the area A is expanded $$r_m = Ar_a + C(r_m - r_a)$$

$$\text{and } C = \frac{r_m - Ar_a}{r_m - r_a}$$

Since A is a constant, and $r_a$ is fixed for a given expansion of the area 10, it can be seen that, C, the value of the scaling function for compression is a function of the distance, $r_m \geq Ar_a$ between the center of the area to be expanded and the edge of the illustration. Thus, the smaller $r_m$ is, i.e. the closer the expanded area is to the edge of the viewing area, the greater the compression (the smaller C is).

If:
 $r_i$=unscaled radius of point x,y,
 $R_i$=scaled radius of point x,y,
 $r_c$=portion of $r_i$ subject to compression.
Then:

$$r_i = r_a + r_c$$

for points along line 14 outside the expanded area and the transforms for such points is:

$$R_i = Ar_a + Cr_c.$$

The transform for points inside the expanded area is:

$$R_i = Ar_i.$$

These transformations can be carried out in polar coordinates as indicated and then converted to cartesian coordinates for presentation on a conventional display device.

Such transforms cause some distortion which is most pronounced on the compressed area side of the boundary between the expanded and compressed areas. This distortion is illustrated in FIG. 5 by the lines 16' and 18' respectively after the transformation.

In order to avoid excessive distortion, caused by the expanded area taking up too much of the viewing area, the expanded area may be limited in size, such as for example, to one fifth the maximum dimension of the viewing area.

Thus, $$Ar_a = 1/5 \text{ max} \qquad 5$$

and it can be seen that the larger the area to be expanded (the larger $r_a$ is) the smaller the value (A) of the scaling function can be.

Figure 6:
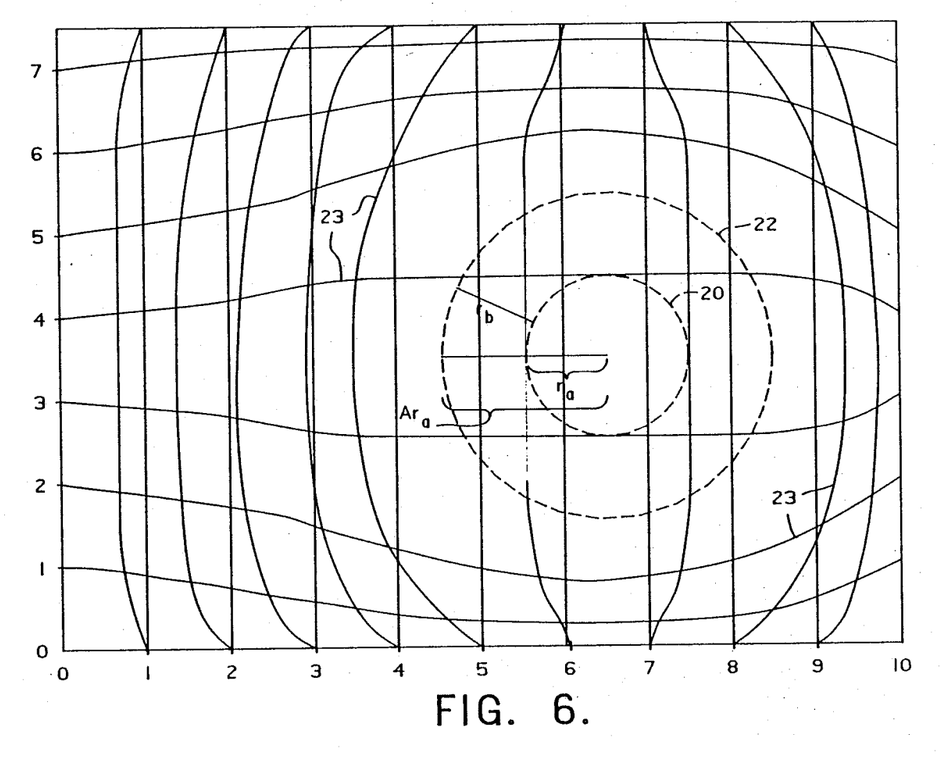
FIG. 6 is an illustration of a display using a transition area with variable scaling around the circular area to which a constant scaling function having a value greater than one is applied to reduce distortion at the boundary with the compressed area.

FIG. 6 illustrates an example of an application of the invention which reduces the distortion exhibited in FIG. 5 at the boundary between the area of constant magnification and the area of compression. As in the example of FIG. 5, constant magnification (hence linear scaling) is applied about a selected point. The required compression to retain the total display content is applied to all areas not affected by the constant magnification. A transition region of variable scaling exists between the areas of magnification and compression to smooth the transition.

In FIG. 6, a scaling function having a value of two is applied to a circular area 20 having a radius $r_a = 1$ centered on the point 6.5, 3.5 such that the undistorted magnified or expanded region is a circle 22 of radius two ($Ar_a$). The transition region to which a variable scaling function is applied, extends radially outward a distance of $r_b$ around the circle 20. In the example, $r_b$ was selected to be equal to $r_a$ so that with a scaling function with a value of 2 the extremity of the region to which the transition scaling function is applied happens to fall on the circle 22 which delineates the boundary of the circle 20 when magnified by the scaling function value A, but this will obviously not always be the case. The transition region when transformed extends radially outward from the circle 22 a variable distance dependent upon the radial distance from the center of the circles 20,22 to the boundary of the total area displayed. The integer valued grid lines 23 in FIG. 6 reveal the distortion imposed on the remaining display areas by the compression and transition scaling.

The scaling functions and transformation functions for the example of FIG. 6, expressed in polar coordinates, are as follows:

Let:

$r_i$, $r_a$, $r_m$, $R_i$ and A represent the same parameters as in the example of FIG. 5.

$r_b$ = the radial length of the transition area.

C = the constant level of compression along a particular radial outside of the expansion and transition areas equal to $(r_m - 1.5 Ar_a)/(r_m - 1.5 r_a)$ based on the fact that $$r_m = r_a + r_b + r_c$$

$$Ar_a + (A+C)r_b/2 + Cr_c = R_m$$

and the condition that $r_a = r_b$.

B = a transitional scaling function between A (the constant level of magnification) and C equal to $A + (C-A)(r_i - r)/r_b$.

Then:

if $r_i \leq r_a$ $$R_i = Ar_i$$

if $r_a < r_i \leq (r_a + r_b)$ $$R_i = Ar_a + \int_{r_a}^{r_i} \left[ A - \frac{A-C}{r_b}(r - r_a) \right] dr$$

$$= Ar_i - \frac{A-C}{2r_b}(r_i - r_a)^2$$

if $r_i > r_a + r_b$ $$R_i = Ar_a + \frac{A+C}{2} r_b + \int_{r_a + r_b}^{r_i} C \, dr$$

$$= (A - C)r_a + \frac{A-C}{2} r_b + Cr_i$$

In the example illustrated in FIG. 6, A=2 as mentioned, and $r_a = r_b = 1$.

It is evident from a comparison of FIGS. 5 and 6 that the use of a transition area between the area of constant magnification and the area of compression greatly reduces the distortion created by variable scaling.

Figure 7:
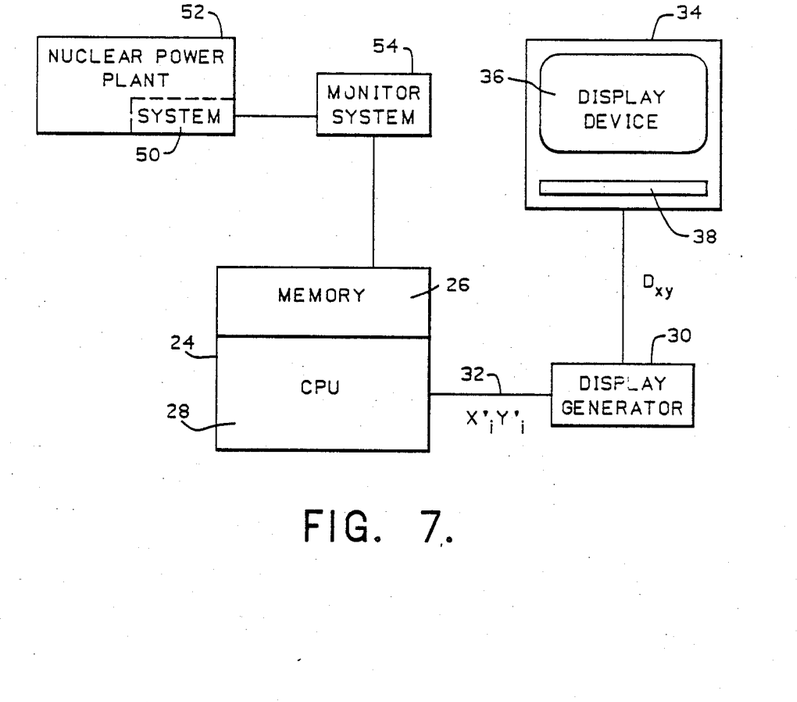
FIG. 7 is a schematic diagram of a system constructed in accordance with the invention for generating variably scaled displays.

FIG. 7 illustrates a system for practicing the invention. The system includes a digital computer 24 having a memory 26 and a central processing unit 28. Electrical signals $x_i y_i$ representative of the image points required to define the image to be displayed are stored in the memory 26. A display generator 30 converts signals received from the computer 24 over lines 32 directing the form of the image to be displayed into signals which produce the desired image on a visual display device 34 having a display screen 36 of fixed dimensions. The display generator 30 may be an integral part of the visual display device 34 or a separate unit. The display device 34 includes means such as a keypad 38 by which the user can input desired parameters and instructions into the system or a touch screen may be provided on the display device 34.

Figure 8:
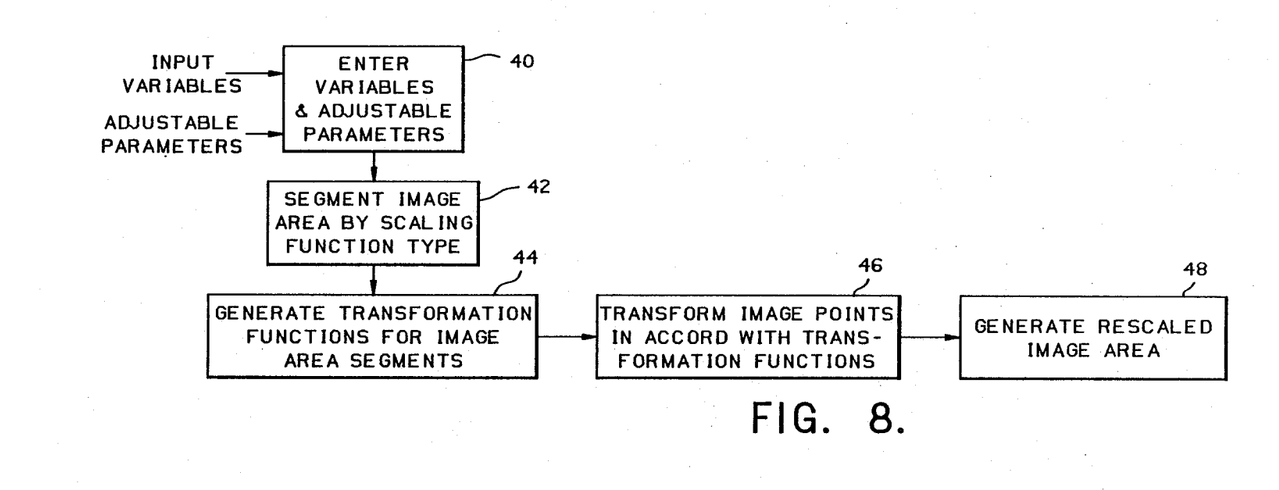
FIG. 8 is a flow chart illustrating operation of the system of FIG. 7 in accordance with the invention.

The manner in which the system of FIG. 7 operates to generate the variably scaled displays is shown by the flow chart of FIG. 8. Initially, the desired parameters are entered as indicated by block 40. The input variables include the areas to be magnified, and the desired magnification scaling function. In some instances, such as the example of FIG. 6, all that need be entered is the location of the center of the circular area to be magnified and the magnification desired. Certain adjustable parameters stored in the computer memory, such as the size of the area to be magnified as a function of the desired magnification scaling function and the size of the transition area relative to the size of the magnified area need not be entered each time the system is used, but can be changed as desired.

Next, the total image area is divided into image area segments by scaling function type as indicated in block 42 and the scaling function for each segment is determined in block 44. This involves selecting the scaling function for each segment so that the mean value of the scaling functions across the entire image is equal to one. The transformation function for each image area segment, is generated taking into account the respective scaling functions. The appropriate transformation function is then applied as in block 46 to each of the image point signals $x_i y_i$ stored in memory to generate transformed image point signals $x_i' y_i'$. These signals are transformed to the display device coordinates in block 48 before being transmitted to the display generator 30 which uses them to generate display signals Dx,y which are appropriate to produce the rescaled image on the screen of the display device 34.

While the invention is useful in generating variably scaled displays in many applications, one particular application is in generating variably scaled displays for the control or surveillance of complex process plants. For instance, a nuclear power plant is a complex power plant with many systems which must be continually monitored. These systems can be depicted schematically on cathode ray tube displays to aid the operator in visualizing the topography of the system for analyzing system status and the effects that action taken will have on the system. As an example, the chemical and volume control system of a pressurized water reactor includes a large number of tanks, pumps, valves and other components which control the concentration of boric acid in the reactor coolant. This is a rather complex system so that the scale of a display that presents the overall system is restricted. By utilizing the present invention, the scale of a selected portion of the system display can be enlarged so that detail data presented, such as component status and parameter values for the portion of interest can be seen more readily without losing the relationship of that portion to the remainder of the system.

For such an application of the invention, data for the image points for generating on the display device 34 of FIG. 7 a schematic flow diagram of the selected system 50 of the nuclear power plant 52 are stored in the memory 26 of digital computer 24. A monitor system 54 monitors the status of the various components and the values of selected parameters such as temperatures, flows etc., in the selected system 50 and feeds the data to the digital computer 24 for inclusion on the visual display of the system. The system operates as described above to generate the desired variable scaling for the display.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of variably rescaling a total image composed of a plurality of image points disposed within boundaries of the total image for display within a display area of fixed dimensions, without altering the boundaries of the total image displayed, said method comprising the steps of:
   dividing the total image into image area segments,
   assigning a selected scaling function to each image area segment, each said selected scaling function being assigned such that the selected scaling function in at least one image area segment has a value greater than one and the selected scaling function in at least another image area segment has a value smaller than one, but with the selected scaling functions over the total image having a mean value equal to one in all directions,
   generating an associated transformation function for each image area segment as a function of the selected scaling function,
   generating transformed image points for each image area segment in accordance with the associated transformation function, and
   generating in said display area of fixed dimensions a rescaled image utilizing the transformed image points such that the total image remains displayed although at least one image area segment of the total image is magnified.

2. The method of claim 1 wherein the step of dividing the total image into image area segments comprises dividing the total image into a first image area segment which is to be magnified and at least a second image area segment which is to be compressed and wherein the step of assigning scaling functions includes assigning a first scaling function having values greater than one to said first image area segment and assigning a second scaling function having values less than one to said second image area segment.

3. The method of claim 2 wherein the first scaling function assigned to said first image area segment is a constant over the segment.

4. The method of claim 3 wherein the size of the first image area segment is selected as an inverse function of the values of the first scaling function.

5. The method of claim 4 wherein the size of said first image area segment is selected relative to said first scaling function such that the first image area segment when magnified covers an area which is a constant for all values of said first scaling function.

6. The method of claim 5 including the step of providing means for selecting said first scaling function which thereby also determines the size of said first image area segment.

7. The method of claim 3 wherein the step of selecting said first image area segment includes selecting a circular first image area segment and wherein the step of selecting a scaling function for the second image area comprises selecting a scaling function which varies as a function of a radial distance from the center of the circular first image area segment to the boundaries of said total image for all angular positions around said circular first image area segment.

8. The method of claim 7 wherein the radius of the circular first image area segment is selected as an inverse function of the value of the first scaling function.

9. The method of claim 8 wherein the radius of the circular first image area segment is selected relative to said first scaling function to maintain the radius of the circular first image area segment when magnified by the first scaling function at a preselected constant value such that the radius of the circular first image area segment is selected by selection of the first scaling function.

10. The method of claim 9 wherein the step of selecting said circular first image area segment comprises selecting a location of the center thereof and selecting a desired first scaling function.

11. The method of claim 10 wherein said display is generated on a touch screen and said circular first image area segment is selected by touching said touch screen at the selected location of the center thereof.

12. The method of claim 11 wherein the value of said first scaling function is selected as a function of a length of time that the touch screen is touched to select the selected location of the center of the first image area segment.

13. The method of claim 2 wherein said first scaling function, which has a value greater than one, is a constant over the first image area segment, wherein said step of dividing the total image into a first, and at least a second image area segment, comprises dividing the total image into a first, a second and a third image area segment with said third image area segment surrounding said first image area segment and wherein the step of assigning scaling functions includes assigning a scaling function to said third image area segment which has a mean value between the value of said first and second scaling functions.

14. The method of claim 13 wherein said total image is divided into a circular first image area segment, a ring shaped third image area segment concentric with and adjacent to said first image area segment and a second image area segment which surrounds the third image area segment, and wherein said second and third scaling functions assigned to said second and third image area segments respectively are functions of a radial distance between the center of the circular first image area segment and the boundaries of the total image for all angular positions around said circular first image area segment.

15. The method of claim 1 wherein said step of generating scaling functions for each image area segment is limited to generating scaling functions which vary in only one cartesian coordinate.

16. A method of variably rescaling a total image on a display composed of a plurality of image points displayed within total image boundaries without varying the boundaries of the total image displayed comprising the steps of:
assigning a variable valued scaling function to at least a segment of said total image, said variable valued scaling function having a value which varies over said segment of said total image such that a mean value of said scaling function over said segment of said total image is one,
generating a transformation function for said segment of said total image which is a function of said variable valued scaling function,
transforming image points for said segment of said total image in accordance with said transformation function, and
generating a rescaled image utilizing the transformed image points such that the total image remains displayed although a part thereof is magnified.

17. The method of claim 16 wherein said variable valued scaling function is a trigonometric function.

18. In a method of operating a nuclear power plant which includes monitoring conditions in a selected plant system and generating a plant system display image representative of the selected plant system including visual indications of monitored conditions in the selected plant system on a display device having an image area of fixed dimensions, the improvement comprising: selecting a segment of the plant system display image for magnification and a scaling function therefor having an average value greater than one, selecting a scaling function having an average value less than one for the remaining segment of the plant system display image which will maintain a mean scaling value of one across the plant system display image, generating a transformation function for each segment of the plant system display as a function of the selected scaling function therefor, transforming image points for each image area segment in accordance with the transformation function therefor, and generating on the display device a rescaled image utilizing the transformed image points such that all of the selected plant system image remains displayed although a segment thereof is magnified.

19. Apparatus for variably rescaling a display composed of a plurality of image points disposed within a total image area of a predetermined size without altering the size of the total image area displayed, said apparatus comprising:
memory means for storing signals representative of image points on the display;
means for generating input signals representative of segments of the total image area to be magnified and scaling functions therefor;
a digital computer programmed to generate in response to said input signals, scaling functions for segments of said total image area outside the segments of the total image area to be magnified such that a mean value of the scaling functions across the total image area is equal to one, to generate a transformation function for each total image area segment as a function of the scaling function generated therefor, and to generate rescaled image point signals by applying an appropriate total image area segment transformation function to each of the image point signals stored in memory,
a display generator to which said rescaled image point signals are applied to generate display signals, and
a display device to which the display signals are applied to generate a variably rescaled visual display composed of rescaled image points.

20. The apparatus of claim 19 wherein said display device comprises a touch screen device on which said display is generated and said means for generating input signals includes the screen of said touch screen device by which a signal indicating the area to be magnified is generated by touching the screen.

21. The apparatus of claim 20 wherein the segment of the total image area to be magnified is circular and said screen is responsive to a touch at a desired location to generate a signal representative of the center of the circular area to be magnified and wherein the means for generating input signals includes means responsive to a duration of the signal representative of the center of the area to be magnified and thus to a length of time that the touch screen is touched for generating a signal representative of a desired value of the scaling function for the circular segment of the total image area to be magnified.

22. The apparatus of claim 19 adapted for use in generating a variably rescaled display of a selected system in a nuclear power plant including:
monitoring means for monitoring selected conditions in the selected system and for generating signals representative thereof which are stored in said memory means as additional image point signals, and wherein said digital computer is further programmed to generate additional rescaled image point signals from said additional image point signals using the appropriate image area segment transformation function, wherein said display generator generates additional display signals therefrom, and wherein said display device generates a display which includes said additional rescaled image points.

* * * * *